United States Patent
Kwon et al.

(10) Patent No.: US 7,746,936 B2
(45) Date of Patent: Jun. 29, 2010

(54) METHOD AND DEVICE FOR OPTIMIZING CODEBOOK FOR QUANTIZED PRECODER BY USING STEEPEST DESCENT ALGORITHM

(75) Inventors: Dong-Seung Kwon, Daejeon (KR); Young-Seog Song, Daejeon (KR); In-Kyeong Choi, Daejeon (KR); Chung-Yong Lee, Seoul (KR); Myeong-Cheol Shin, Goyang (KR); Myoung-Seog Kim, Seoul (KR); Seung-Joon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 662 days.

(21) Appl. No.: 11/743,147

(22) Filed: May 2, 2007

(65) Prior Publication Data

US 2008/0081669 A1 Apr. 3, 2008

(30) Foreign Application Priority Data

Sep. 29, 2006 (KR) .................. 10-2006-0095650

(51) Int. Cl.
*H04B 14/04* (2006.01)
*H04L 7/02* (2006.01)
(52) U.S. Cl. ..................... 375/242; 375/267
(58) Field of Classification Search ........... 375/242, 375/245, 260, 267
See application file for complete search history.

(56) References Cited

U.S. PATENT DOCUMENTS

| | | | | | |
|---|---|---|---|---|---|
| 5,619,537 | A | * | 4/1997 | Altes | 375/322 |
| 5,832,022 | A | * | 11/1998 | Scott | 375/142 |
| 7,586,974 | B2 | * | 9/2009 | Khayrallah et al. | 375/142 |
| 2004/0176950 | A1 | | 9/2004 | Chu | |

OTHER PUBLICATIONS

"Optimizing Codebook for Quantized Precoder Using Steepest Decent Method Considering Codeword Quantization", Korean Institute of Communication Sciences, Jul. 2006 Presentation, Jul. 5, 2006-Jul. 7, 2006.
Agrawal et al., "Multiple-Antenna Signal Constellations for Fading Channels," *IEEE Transactions on Information Theory* 47:2618-2626 (2001).
Love et al., "Limited Feedback Unitary Precoding for Spatial Multiplexing Systems," *IEEE Transactions on Information Theory* 51:2967-2976 (2005).

* cited by examiner

*Primary Examiner*—Don N Vo

(57) ABSTRACT

In a method for optimizing a codebook including a quantized channel between a base station transmitter and a portable terminal: a) select the codebook to be optimized; b) a steepest descent algorithm is applied to respective codewords of the codebook selected in a), wherein the codewords are transformed so that a correlation between the codewords is minimized, and a function indicating the correlation between the codewords is differentiated and is multiplied by a predetermined step size and is used for a parameter for generating a new codeword in the steepest descent algorithm; c) it is determined whether the codebook including the codewords transformed in b) is optimized; and d) the codebook is stored when it is determined in c) that the codebook is optimized.

13 Claims, 9 Drawing Sheets

FIG.1 (Prior Art)

Chordal distance distribution of codebook V(4,1,3)

Chordal distance distribution of codebook V(4,2,6)

METHOD AND DEVICE FOR OPTIMIZING CODEBOOK FOR QUANTIZED PRECODER BY USING STEEPEST DESCENT ALGORITHM

CROSS-REFERENCE TO RELATED APPLICATION

This application claims priority to and the benefit of Korean Patent Application No. 10-2006-0095650 filed in the Korean Intellectual Property Office on Sep. 29, 2006, the entire contents of which are incorporated herein by reference.

BACKGROUND OF THE INVENTION (a) Field of the Invention

The present invention relates to a quantized precoder codebook optimizing device and method using a steepest descent algorithm. More particularly, the present invention relates to a quantized precoder codebook optimizing device and method for minimizing a maximum correlation between codewords of a codebook including quantized channels by using a steepest descent algorithm in a mobile communication system.

(b) Description of the Related Art

A conventional mobile communication system may not obtain instantaneous downlink channel information at a transmitter since downlink and uplink channel are different. Accordingly, it is required to provide feedback of channel information estimated by a receiving terminal to a transmitter to obtain the channel information at the transmitter. However, since the instantaneous channel information may not be transmitted in a situation in which a band of a feedback channel is limited, it is required to use an information compression method for reducing the channel information, and a quantized preceding method for precoding a symbol at a transmitting terminal by using quantized channel information has been suggested.

In the quantized precoding method, a space formed by channels with multiple antennas is uniformly quantized to generate a codebook, the codebook is shared by transmitting and receiving terminals, and a codebook index of a relatively small size is transmitted from the receiving terminal to the transmitting terminal rather than transmitting information of all channels. In this case, when the size of the codebook is large enough, performance is close to that of transmit maximum ratio combining (Transmit-MRC or MRT) and eigen beamforming method.

The codebook of conventional quantized precoder is designed so that codewords are distributed uniformly in a space formed by the channel, but it is not completely optimized since it has a limit in designing the codebook. It is determined by a correlation between the codewords.

A 3-bit vector codebook, a 6-bit vector codebook, and a 6-bit matrix codebook among conventional codebook design methods will be exemplified.

Firstly, the space formed by a vector channel is uniformly quantized by 8 vectors to form the 3-bit vector codebook, and the number of combinations of the generated codewords is small compared to other conditions (e.g., the 6-bit vector codebook and the matrix codebook). Accordingly, in the 802.16e, the 3-bit vector codebook is generated by a random full search method. The codebook of 2 or 3 transmit antennas is optimized by the random full search method. However, in a case of the codebook of 4 transmit antennas, since chordal distances between the codewords are not the same as each other, the channel may not be efficiently copied.

Figure 1:
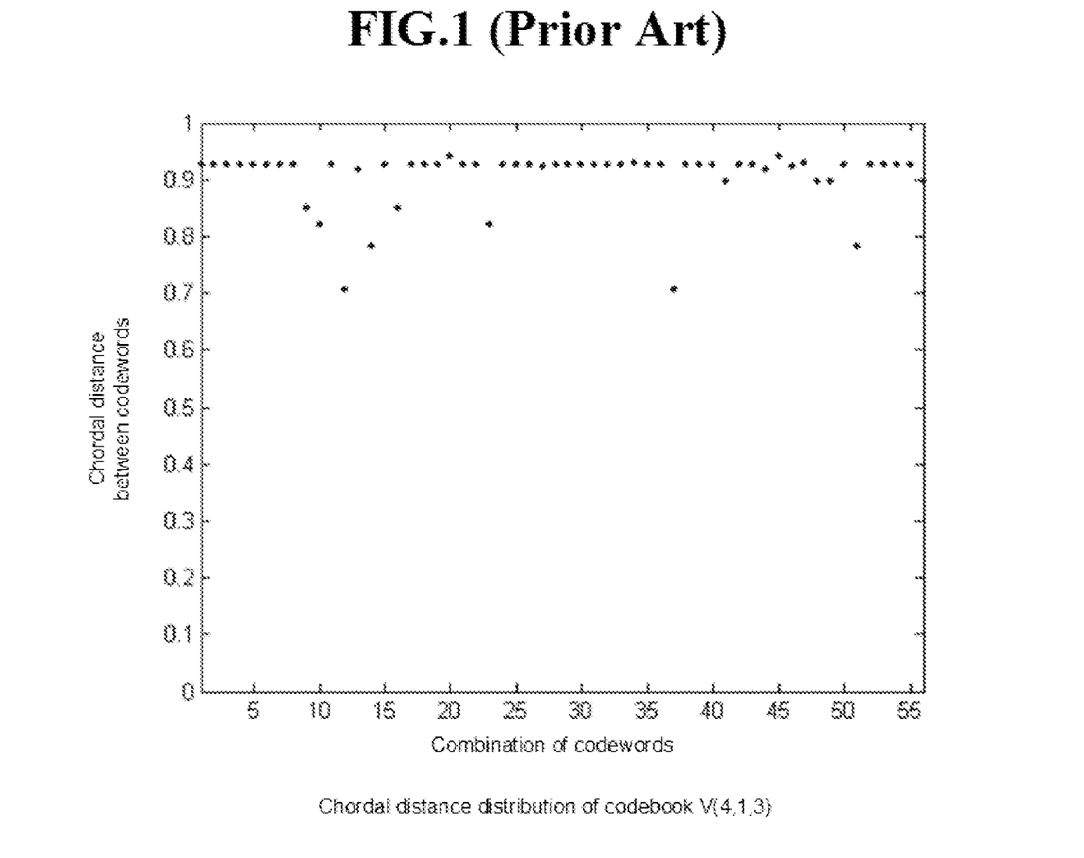
FIG. 1 shows a diagram representing chordal distance distributions according to the conventional 3-bit vector codebook when the number of transmit antennas is 4 and the number of streams is 1.

FIG. 1 shows a diagram representing chordal distance distributions according to the conventional 3-bit vector codebook when the number of transmitting antennas is 4 and the number of streams is 1. In FIG. 1, the chordal distances between the codewords are not the same.

In the case of the 6-bit vector codebook, a codeword is generated by codebook generation matrix and unitary transformation matrix. A frequency of codebook generation matrix and a householder vector of unitary transformation matrix are determined so that the codebook has the lowest maximum correlation (or the highest minimum chordal distance) between the codewords.

Figure 2:
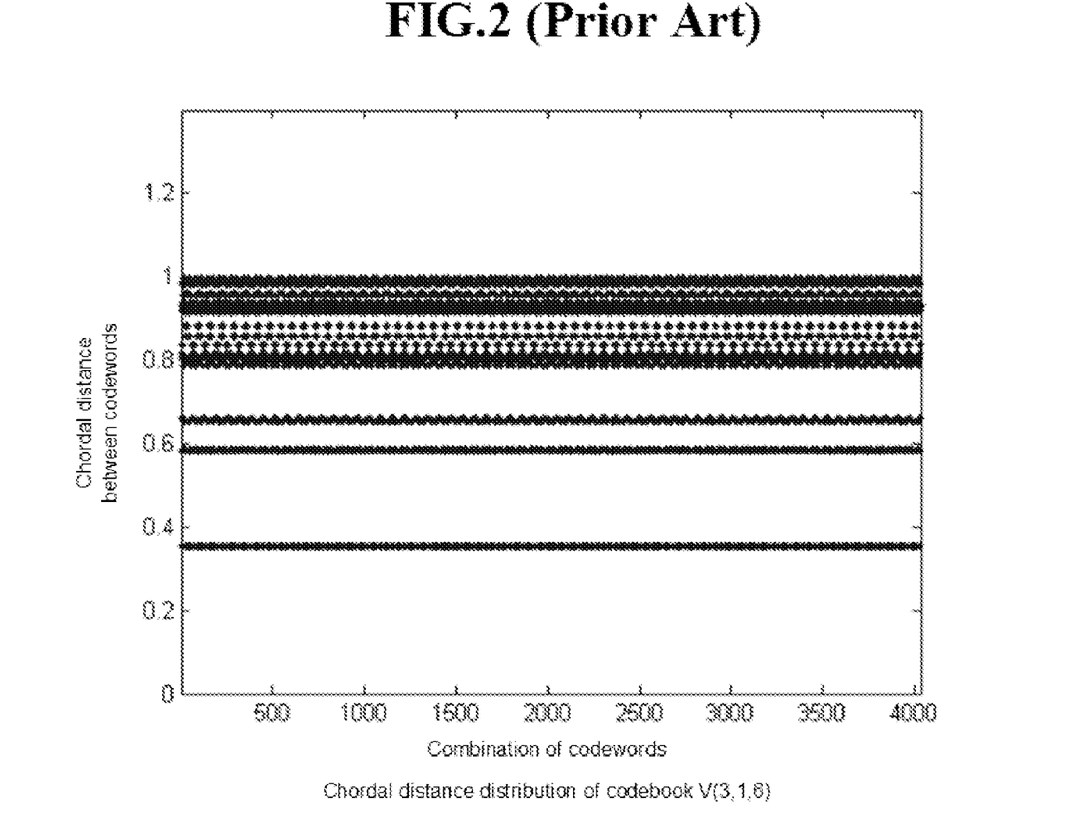
FIG. 2 shows a diagram representing chordal distance distributions according to the conventional 6-bit vector codebook when the number of transmit antennas is 3 and the number of streams is 1.

FIG. 2 shows a diagram representing chordal distance distributions according to the conventional 6-bit vector codebook when the number of transmit antennas is 3 and the number of streams is 1. In FIG. 2, the minimum chordal distance is not great enough since a searching operation is performed in a limited space.

Figure 3:
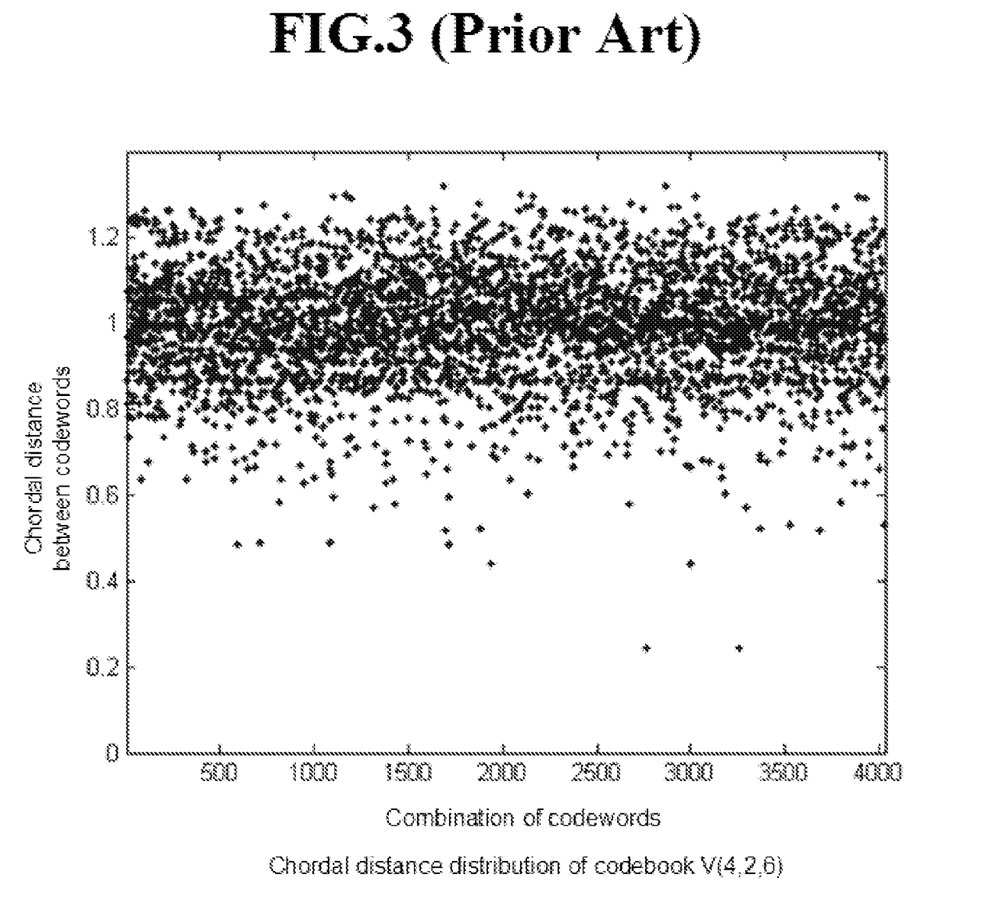
FIG. 3 shows a diagram representing chordal distance distributions according to the conventional 6-bit matrix codebook when the number of transmit antennas is 4 and the number of streams is 2.

FIG. 3 shows a diagram representing chordal distance distributions according to the conventional 6-bit matrix codebook when the number of transmit antennas is 4 and the number of streams is 2. In FIG. 3, the minimum chordal distance is not great enough since the codebook is extended from pre-designed vector codebook by performing a householder concatenation operation and a householder extension operation.

As described, the codebook of conventional quantized precoder is designed so that the space formed by the channel is uniformly copied, but it is not completely optimized since it has a limit in designing the codebook.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a quantized precoder codebook optimizing method by minimizing maximum correlation between codewords using a steepest descent algorithm.

In an exemplary method for optimizing a codebook including a quantized channel between a base station transmitter and a portable terminal: a) select the codebook to be optimized; b) a steepest descent algorithm is applied to respective codewords of the codebook selected in a) and the codewords are transformed so that correlation between the codewords is minimized, where the steepest descent algorithm is an algorithm in which a function indicating the correlation between the codewords is differentiated and is multiplied by a predetermined step size and is used for a parameter for generating a new codeword; c) it is determined whether the codebook including the codewords transformed in b) is optimized; and d) the codebook is stored when it is determined in c) that the codebook is optimized.

An exemplary device according to an embodiment of the present invention optimizes a codebook including a quantized channel between a base station transmitter and a portable terminal. The exemplary device includes an optimized codebook storage module, an algorithm module, an optimization determining module, and a control module. The optimized codebook storage module stores the codebook. The algorithm module receives the codebook and transforms a codeword by using a steepest descent algorithm so that correlation between the codewords of the codebook is minimized, where the steepest descent algorithm is an algorithm in which a function indicating the correlation between the codewords is differentiated and is multiplied by a predetermined step size and is used for a parameter for generating a new codeword. The optimization determining module is connected to the algorithm module to determine whether the transformed codeword is optimized. The control module controls the optimized codebook storage module, the algorithm module, and the optimization determining module, and stores the codebook including the transformed codeword in the optimized codebook storage module when it is determined by the optimization determining module that the transformed codeword is optimized.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, unless explicitly described to the contrary, the word "comprise" and variations such as "comprises" or "comprising" will be understood to imply the inclusion of stated elements but not the exclusion of any other elements.

In addition, the word "module" will be understood to indicate a unit for processing a predetermined function or operation, which may be realized by hardware, software, or a combination thereof.

Figure 4:
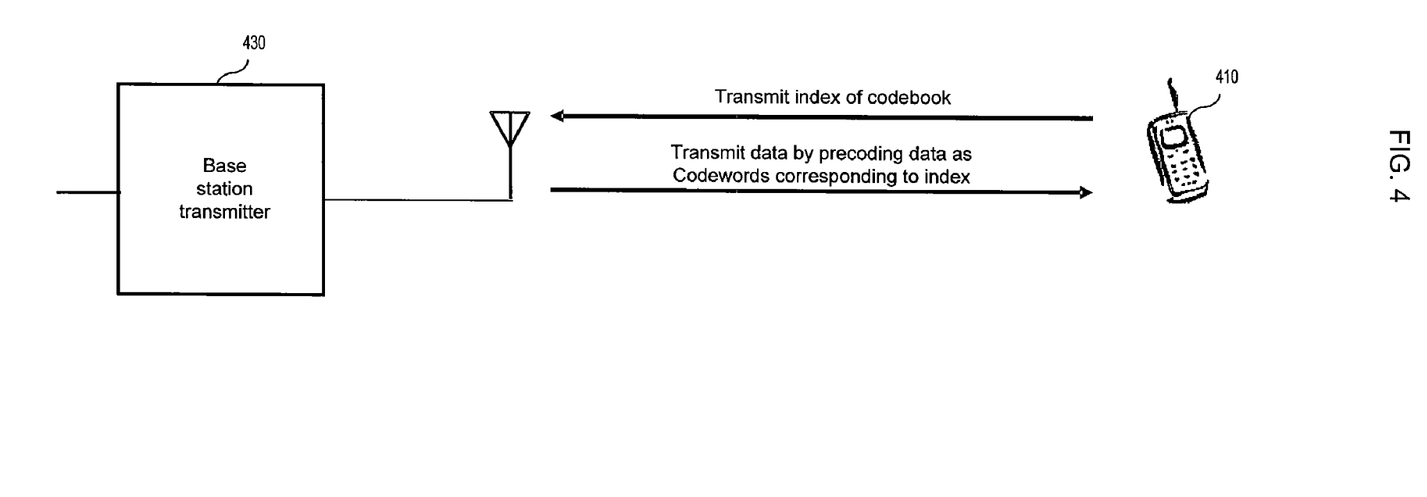
FIG. 4 shows a diagram representing a process for providing a feedback of channel information by using an optimized codebook and transmitting data by using the feedback information.

FIG. 4 shows a diagram representing a process for providing a feedback of channel information by using an optimized codebook and transmitting data by using the feedback information.

A system for transmitting the data by using the optimized codebook according to an exemplary embodiment of the present invention includes a mobile communication terminal 410 and a base station transmitter 430.

The mobile communication terminal 410 wirelessly accesses the base station transmitter 430 to transmit and receive the data.

In the exemplary embodiment of the present invention, transmitting and receiving terminals of a quantization precoder formed by the base station transmitter 430 and the mobile communication terminal 410 store a codebook optimized by a steepest descent algorithm. In addition, the mobile communication terminal 410 detects an index of the codeword, from the optimized codebook, that includes instantaneous channel information required for downlink transmission between the base station transmitter 430 and the mobile communication terminal 410, and transmits the index to the base station transmitter 430.

A method for generating the optimized codebook by using the steepest descent algorithm will be described later in the specification.

The base station transmitter 430 wirelessly transmits and receives the data to and from the mobile communication terminal 410.

In the exemplary embodiment of the present invention, the transmitting and receiving terminals of the base station transmitter 430 and the transmitting and receiving terminals of the mobile communication terminal 410 store the same codebook, and the base station transmitter 430 requests the channel information from the mobile communication terminal 410 to precode and transmit the data to the mobile communication terminal 410. In this case, the base station transmitter 430 receives an index of the codeword including the channel information from the mobile communication terminal 410, detects a codeword corresponding to the received index, precodes the transmit symbol with the codeword.

A device for optimizing the codebook according to the exemplary embodiment of the present invention will now be described.

Figure 5:
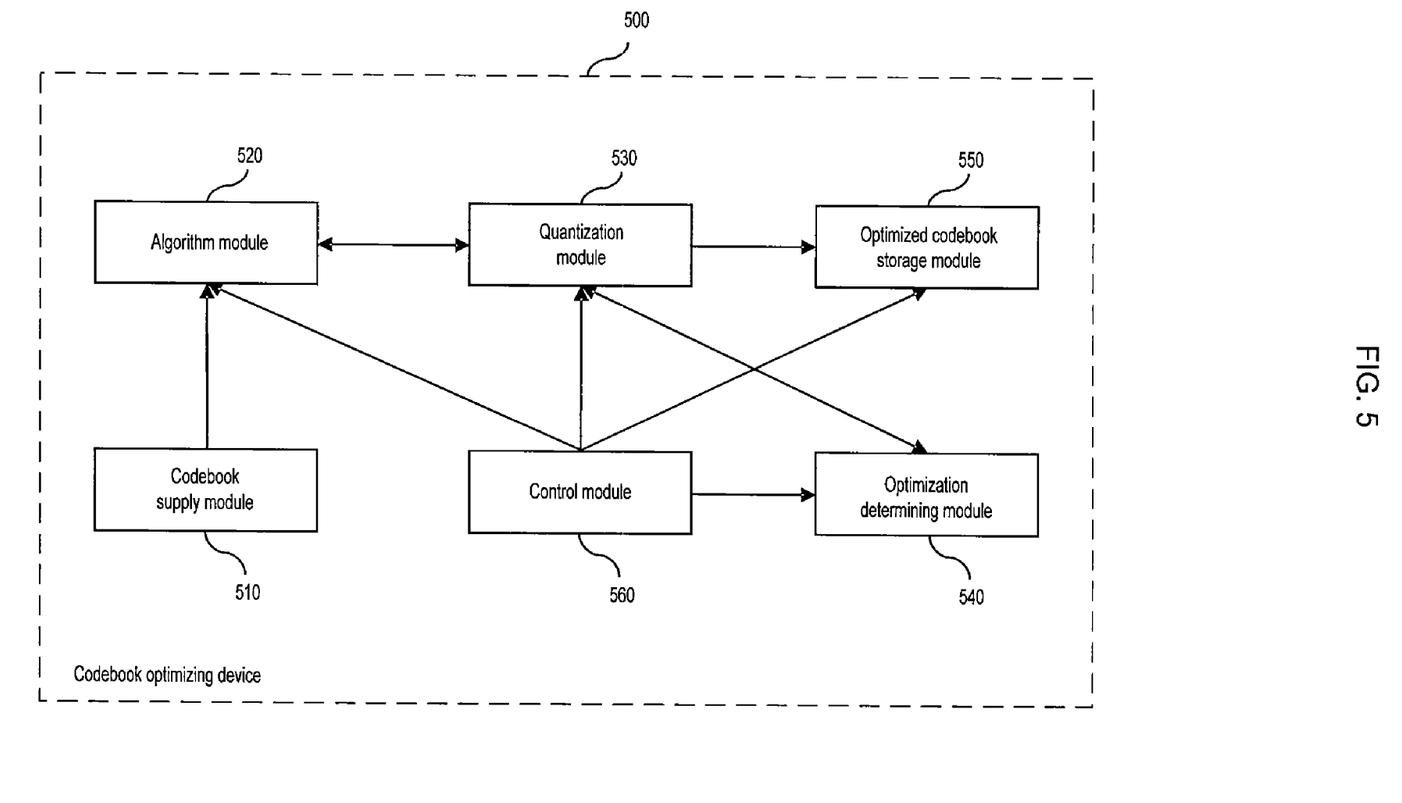
FIG. 5 shows a diagram representing the device for optimizing the codebook according to the exemplary embodiment of the present invention.

FIG. 5 shows a diagram representing the device for optimizing the codebook according to the exemplary embodiment of the present invention.

Referring to FIG. 5, a codebook optimizing device 500 according to the exemplary embodiment of the present invention includes a codebook supply module 510, an algorithm module 520, a quantization module 530, an optimization determining module 540, an optimized codebook storage module 550, and a control module 560.

The codebook supply module 510 stores the conventional codebook or generates a matrix having a unitary characteristic to generate a codebook. In the exemplary embodiment of the present invention, it is described that the codebook supply module 510 is included in the codebook optimizing device 500, but it is not limited thereto, and the codebook supply module 510 may be provided outside the codebook optimizing device 500.

The algorithm module 520 stores the steepest descent algorithm for optimizing the codebook. The steepest descent algorithm uses a surrogate function instead of maximum correlation between the codewords of the codebook so that differentiation of maximum correlation is possible. Since surrogate function make differentiation possible, optimizing the codebook is possible by process of minimizing the maximum correlation between the codewords using steepest descent method.

The quantization module 530 quantizes the codeword generated by the algorithm module 520 and stores the codewords in the codebook. Since the quantization module 530 quantizes the codewords, the codebook is again optimized.

Accordingly, in the exemplary embodiment of the present invention, the quantization module 530 is provided, but it is not limited thereto, and the codebook may be optimized without the quantization module 530.

The optimization determining module 540 determines whether the codebook generated by the algorithm module 520 and the quantization module 530 is optimized. A method for determining whether the codebook is optimized will be described later when the method for optimizing the codebook is described.

The optimized codebook storage module 550 is a database for storing the codebook that is determined to be optimized by the optimization determining module 540. Here, the optimized codebook storage module 550 is provided in the codebook optimizing device 500 in the exemplary embodiment of the present invention, but it is not limited thereto, and it may be formed as a database that is additionally provided outside the codebook optimizing device 500.

The control module 560 is connected to each module and controls each module.

Operations of the respective modules of the codebook optimizing device 500 according to the exemplary embodiment of the present invention will now be described.

Figure 6:
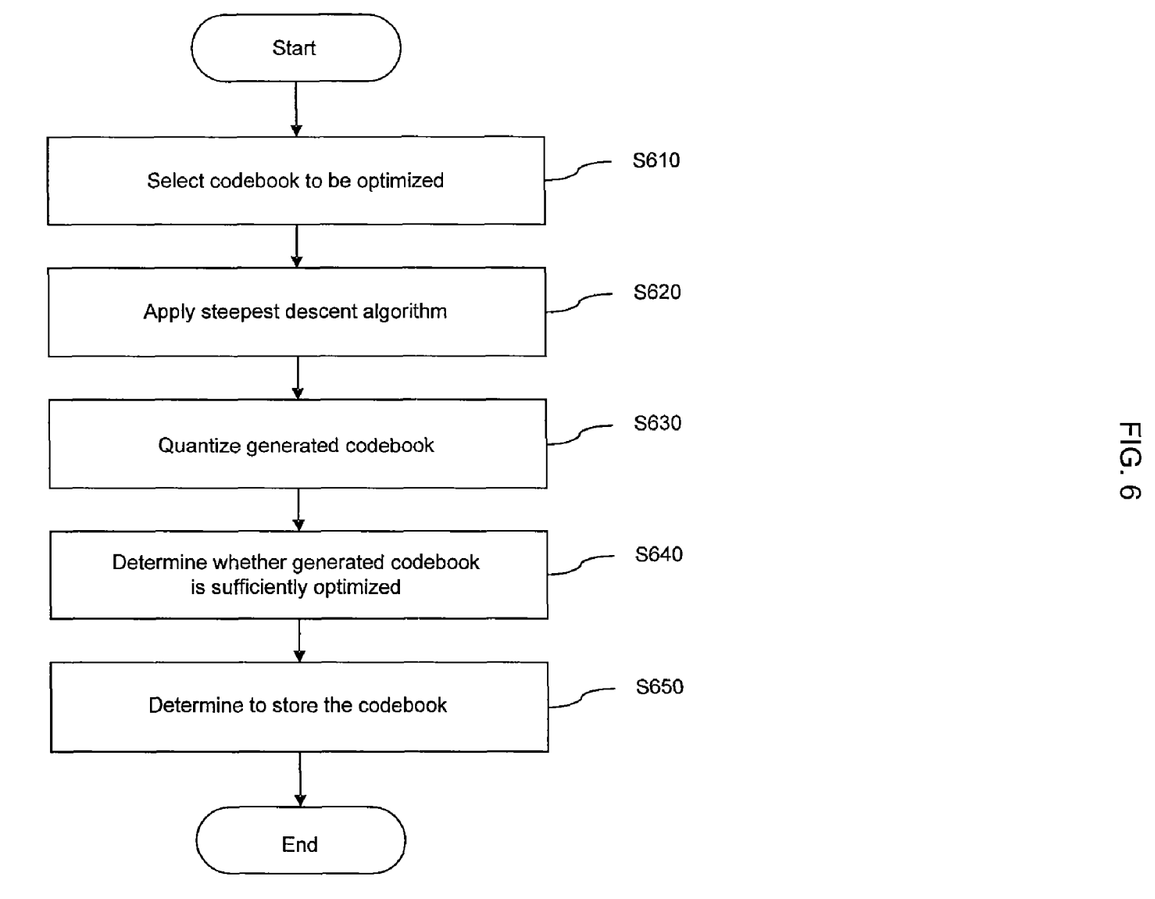
FIG. 6 is a flowchart representing the method for optimizing the codebook according to the exemplary embodiment of the present invention.

FIG. 6 is a flowchart representing the method for optimizing the codebook according to the exemplary embodiment of the present invention.

Referring to FIG. 6, the codebook supply module 510 selects a codebook to be optimized in step S610. Here, the codebook is the conventional codebook or a predetermined matrix having a unitary characteristic, and the codeword set of the selected codebook is given as Equation 1.

$$\{\Phi_1, \Phi_2, \ldots, \Phi_L\} = V(N_t, N_s, L) \quad \text{[Equation 1]}$$

Here, $V(N_t, N_s, L)$ denotes a codebook having $N_t$ transmitting antennas, $N_s$ streams, and $L$ codeword indexes, and $\Phi_1, \Phi_2, \ldots, \Phi_L$ denotes codewords in the codebook $V(N_t, N_s, L)$.

Subsequently, the algorithm module 520 applies the steepest descent algorithm to the codeword of the codebook selected by the codebook supply module 510 to optimize the codebook in step S620. In this case, to optimize the codebook, the codeword is transformed such that the correlation between the codewords is minimized, and the correlation between the codewords is minimized by using the surrogate function that is transformed to be differentiated in the exemplary embodiment of the present invention.

A reason why the surrogate function is used to minimize the correlation between the codewords will now be described.

As described above, the codebook is optimized such that a maximum correlation between the codewords may be reduced, and the maximum correlation between the codewords is given as Equation 2.

$$\sigma^*(V(N_t, N_s, L)) = \max_{1 \le i < j \le L} \sqrt{\langle \Phi_i^* \Phi_j, \Phi_i^* \Phi_j \rangle} \quad \text{[Equation 2]}$$

$\sigma^*(V(N_t, N_s, L))$ denotes a correlation of the codebook $V(N_t, N_s, L)$, and $\Phi_i$ and $\Phi_j$ respectively denote ith and jth codewords.

However, the codebook may not always be differentiated in Equation 2. In addition, since the correlation between the codewords does not have one minimum value for the codebook but has extremal values that are far from the minimum value, it is required to use the surrogate function to obtain one minimum value when the correlation between the codewords is obtained. To obtain the one minimum value, the surrogate function is required to satisfy at least three following conditions, and for convenience of description, the surrogate function is denoted by $f_\alpha$.

1) $f_\alpha$ is required to be differentiated for all $\alpha$s (here, $\alpha$ denotes a natural number).

2) $f_\alpha$ is required to include only a few extremal values for small $\alpha$s.

3) $f_\alpha$ is required to well represent the maximum correlation between the codewords.

The surrogate function that satisfies the above conditions is given as Equation 3 in the exemplary embodiment of the present invention.

$$f_\alpha(V) = \frac{1}{\alpha} \log \left( \sum_{1 \le i < j \le L} \exp(\alpha \langle \Phi_i^* \Phi_j, \Phi_i^* \Phi_j \rangle) \right) \quad \text{[Equation 3]}$$

Since log and exp functions are used in the surrogate function of Equation 3 rather than using a max function in Equation 2, the surrogate function may be differentiated for all the $\alpha$s, and a maximum value may be copied by using an exponential characteristic of the exp function in which an output value is rapidly increased as an input value is increased.

That is, when $\alpha$ is big, $f_\alpha$ is not affected by the correlation between the codewords having a relatively low value, and is mainly affected by the maximum correlation. In addition, when $\alpha$ is small, $f_\alpha$ is affected by the correlations between the codewords regardless of a size of the correlation. Accordingly, since the correlations between the codewords in addition to the maximum correlation are reduced when the surrogate function is used, a probability of remaining at the extremal value rather than remaining at the minimum value in a codebook optimization process may be reduced.

There are three steps for optimizing the codebook by using the surrogate function in the algorithm module 520, which will now be described.

(1) Find a codebook $V_{\alpha_0}$ that minimizes $f_{\alpha_0}$ for an initial value $\alpha_0$. In this case, $V_{\alpha_0}$ is given as Equation 4.

$$V_{\alpha_0} = \arg\min_V f_{\alpha_0}(V) \quad \text{[Equation 4]}$$

(2) Slightly increase $\alpha_k$ ($>\alpha_{k-1}$) and find a codebook $V_{\alpha_k}$ that minimizes $f_{\alpha_k}$. In this case, $V_{\alpha_k}$ is given as Equation 5.

$$V_{\alpha_k} = \arg\min_V f_{\alpha_k}(V_{\alpha_{k-1}}) \qquad \text{[Equation 5]}$$

(3) Continue above steps, increasing the value of α slightly and tracking the minimizer of $f_\alpha$, until $f_\alpha$ is essentially equivalent to the maximum correlation between the codewords.

In the step (2), the codebook $V_{\alpha_k}$ for minimizing $f_{\alpha_k}$ is detected by using the steepest descent algorithm that will now be described.

It is required to differentiate $f_{\alpha_k}(V_{\alpha_{k-1}})$ for $V_{\alpha_{k-1}}$ to detect the codebook $V_{\alpha_k}$ for minimizing $f_{\alpha_k}$, but there is a limit in a differentiation operation since $V_{\alpha_{k-1}}$ is a combination of matrixes. Accordingly, one codeword is parameterized to differentiate $f_{\alpha_k}(V_{\alpha_{k-1}})$ for respective parameters.

In this case, for convenience of operations, a unitary transforming matrix is parameterized so that the existing codeword is transformed to a new codeword given as Equation 6.

$$\tilde{\Phi}_k = U_{N_t \times N_t}(\Theta_k)\Phi_k \qquad \text{[Equation 6]}$$

Here, $\tilde{\Phi}_k$ denotes a kth codeword transformed by the unitary matrix $U_{N_t \times N_t}$ and parameterized by $\Theta_k$, $U_{N_t \times N_t}$ denotes a unitary matrix having $N_t$ rows and $N_t$ columns, $\Theta_k$ denotes a parameter for generating a kth new codeword, and $\Phi_k$ denotes a kth codeword to be transformed by the unitary matrix. In addition, $U_{N_t \times N_t}(\Theta_k)$ denotes a codeword transformation matrix.

Here, the codeword transformation matrix $U_{N_t \times N_t}(\Theta_k)$ is expressed as $N_t^2$ parameters by a unitary parameterization process given as Equation 7. In addition, the codeword transformation matrix $U_{N_t \times N_t}(\Theta_k)$ is a unit matrix and the codeword is not transformed when all the parameters are "0".

$$U_{N_t \times N_t}(\Theta) = diag(\delta_1, \cdots, \delta_{N_t}) \qquad \text{[Equation 7]}$$
$$\times \{U^{N_t-1,N_t}(\phi_{N_t-1,N_t}, \sigma_{N_t-1,N_t})\}$$
$$\times \{U^{N_t-2,N_t-1}(\phi_{N_t-2,N_t-1}, \sigma_{N_t-2,N_t-1})U^{N_t-2,N_t}$$
$$(\phi_{N_t-2,N_t}, \sigma_{N_t-2,N_t})\}$$
$$\times \cdots$$
$$\times \{U^{12}(\phi_{12}, \sigma_{12})\cdots U^{1N_t}(\phi_{1N_t}, \sigma_{1N_t})\}$$

A basic unitary matrix $U^{p,q}(\phi_{p,q}, \sigma_{p,q})$ in Equation 7 may be defined as Equation 8, and the basic unitary matrix $U^{p,q}(\phi_{p,q}, \sigma_{p,q})$ can be used to change the ith and jth entries of a column vector of a matrix by multiplying the basic unitary matrix.

$$\{U^{p,q}(\phi_{p,q}, \sigma_{p,q})\}_{j,k} = \qquad \text{[Equation 8]}$$
$$\begin{cases} 1 & \text{if } (j,k) = (l,l) \text{ where } l \neq p, l \neq q \\ \cos(\phi_{p,q}) & \text{if } (j,k) = (p,p) \text{ or } (q,q) \\ -\sin(\phi_{p,q})\exp(-i\sigma_{p,q}) & \text{if } (j,k) = (p,q) \\ \sin(\phi_{p,q})\exp(i\sigma_{p,q}) & \text{if } (j,k) = (q,p) \\ 0 & \text{otherwise} \end{cases}$$

The codeword of the codebook is parameterized in the above process, and the parameter thereof is differentiated as shown in Equation 9, and is multiplied by a parameter −c of a predetermined size. In the case, the parameter −c is used to control a convergent speed.

$$\Theta_k = -c\nabla_k f_\alpha(V) \qquad \text{[Equation 9]}$$
$$= -c\frac{\partial}{\partial \Theta_k}\frac{1}{\alpha}\log$$
$$\left. \left( \begin{array}{c} \sum_{1 \leq k < j \leq L} \exp(\alpha\langle \Phi_k^* U_{N_t \times N_t}^*(\Theta_k)\Phi_j, \\ \Phi_k^* U_{N_t \times N_t}^*(\Theta_k)\Phi_j \rangle) + \\ \sum_{1 \leq i < j \leq L, i \neq k} \exp(\alpha\langle \Phi_i^* \Phi_j, \Phi_i^* \Phi_j \rangle) \end{array} \right) \right|_{\Theta_k=0}$$

Subsequently, a resulting value $\Theta_k$ of Equation 9 is used as a parameter for generating the new codeword, which is referred to as the steepest descent algorithm.

Figure 7:
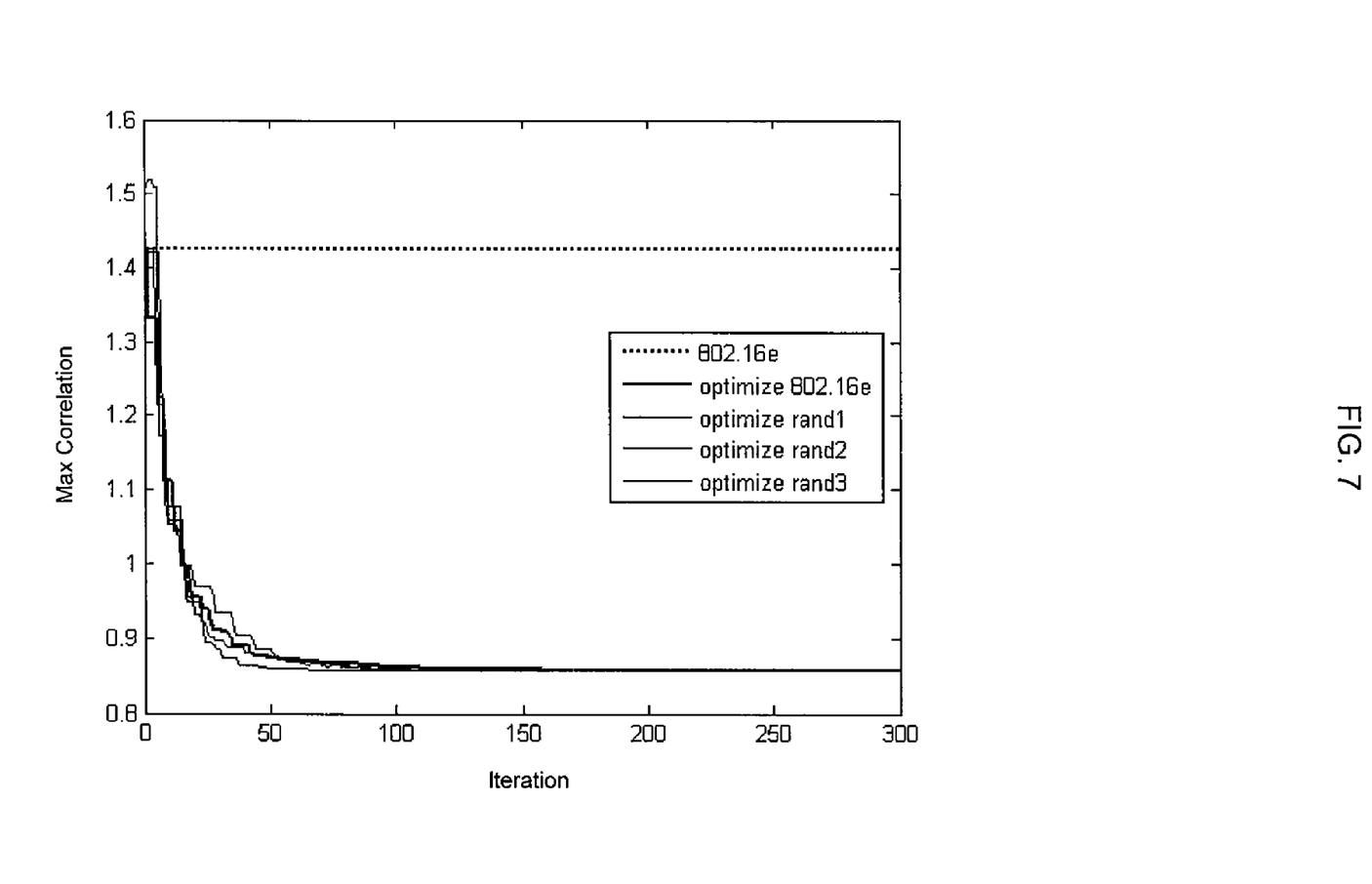
FIG. 7 shows a diagram representing a variation of the maximum correlation between the codebooks according to the steepest descent algorithm.

FIG. 7 shows a diagram representing a variation of the maximum correlation between the codewords according to the steepest descent algorithm.

Referring to FIG. 7, the codebook is optimized by the steepest descent algorithm. In this case, the codebooks are optimized to have the same minimum values when any unitary codebook is randomly generated and the steepest descent algorithm is applied.

In the above-mentioned process, the codebook is optimized by the algorithm module 520.

Subsequently, the quantization module 530 quantizes codewords of the codebook generated by the algorithm module 520 in step S630. Generally, elements of the respective codewords are quantized to store the codebook in a limited memory. In this case, however, when the size of the codeword is increased or the number of codewords is increased, a required memory space is increased since data to be stored are increased. Accordingly, a quantization error is problematically generated to physically store the data in the limited memory. In addition, since the generated quantization error deteriorates unitary characteristics of the codeword, it is required to use a method for quantizing the parameter for generating the respective codewords rather than quantizing the element of the respective codewords.

Here, when the parameter generating the codeword is quantized and the codeword is generated by a unitary matrix generator shown in Equation 10, which the unitary characteristics are not broken.

$$V(N_t, N_s, L)_l = U(\Theta_l), \qquad \text{[Equation 10]}$$
where $U(\Theta) = U^{1,N_t^*}(\phi_{1,N_t}, \sigma_{1,N_t})\cdots U^{1,3^*}(\phi_{1,3}, \sigma_{1,3})$
$$U^{1,2^*}(\phi_{1,2}, \sigma_{1,2})$$
$$\times U^{2,N_t^*}(\phi_{2,N_t}, \sigma_{2,N_t})\cdots U^{2,3^*}(\phi_{2,3}, \sigma_{2,3})$$
$$\times \cdots$$
$$\times U^{N_s,N_t^*}(\phi_{N_s,N_t}, \sigma_{N_s,N_t})$$
$$\times U^0(\delta_1, \cdots \delta_{N_s})$$
$$-\frac{\pi}{2} \leq \phi \leq \frac{\pi}{2}, -\pi \leq \sigma \leq \pi, -\pi \leq \delta \leq \pi$$

Here, parameters in Equation 10 are obtained by a process of parameterizing the unitary matrix (referring to Equation 7).

In Table 1 to Table 8, respective parameters generating codeword according to the exemplary embodiment of the present invention are quantized in 8-bit to express 256 indexes, and the indexes are sequenced in an order from a lowest value.

Here, Table 1 shows quantized parameter indexes required to generate the optimized codebook V (4, 1, 3), Table 2 shows quantized parameter indexes required to generate the optimized codebook V (4, 3, 3), Table 3 shows quantized parameter indexes required to generate the optimized codebook V (3, 1, 6), Table 4 shows quantized parameter indexes required to optimize the codebook V (4, 1, 6), Table 5 shows quantized parameter indexes required to generate the optimized codebook V (3, 2, 6), Table 6 shows quantized parameter indexes required to generate the optimized codebook V (4, 2, 6), and Table 7 shows quantized parameter indexes required to generate the optimized codebook V (4, 3, 6).

TABLE 1

| | $\delta_1$ | $\phi_{12}$ | $\phi_{13}$ | $\phi_{14}$ | $\sigma_{12}$ | $\sigma_{13}$ | $\sigma_{14}$ |
|---|---|---|---|---|---|---|---|
| 1 | 120 | 129 | 128 | 130 | 135 | 128 | 145 |
| 2 | 79 | 182 | 54 | 73 | 177 | 144 | 84 |
| 3 | 129 | 193 | 163 | 51 | 118 | 153 | 179 |
| 4 | 128 | 103 | 43 | 182 | 113 | 67 | 123 |
| 5 | 126 | 187 | 125 | 214 | 72 | 162 | 173 |
| 6 | 127 | 72 | 75 | 57 | 153 | 150 | 172 |
| 7 | 128 | 108 | 174 | 40 | 100 | 130 | 109 |
| 8 | 130 | 99 | 185 | 212 | 69 | 86 | 112 |

TABLE 2

| | $\delta_1$ | $\delta_2$ | $\delta_3$ | $\phi_{12}$ | $\phi_{13}$ | $\phi_{14}$ | $\phi_{23}$ | $\phi_{24}$ | $\phi_{34}$ | $\sigma_{12}$ | $\sigma_{13}$ | $\sigma_{14}$ | $\sigma_{23}$ | $\sigma_{24}$ | $\sigma_{34}$ |
|---|---|---|---|---|---|---|---|---|---|---|---|---|---|---|---|
| 1 | 128 | 1 | 256 | 1 | 116 | 105 | 244 | 127 | 233 | 131 | 131 | 131 | 127 | 130 | 128 |
| 2 | 21 | 173 | 239 | 154 | 195 | 184 | 119 | 44 | 191 | 138 | 116 | 155 | 91 | 72 | 107 |
| 3 | 8 | 223 | 100 | 141 | 101 | 183 | 229 | 132 | 54 | 123 | 152 | 182 | 163 | 147 | 156 |
| 4 | 141 | 47 | 74 | 45 | 201 | 100 | 185 | 135 | 30 | 115 | 69 | 121 | 82 | 132 | 182 |
| 5 | 59 | 27 | 136 | 154 | 133 | 63 | 252 | 144 | 58 | 69 | 185 | 171 | 101 | 144 | 127 |
| 6 | 103 | 6 | 230 | 98 | 173 | 182 | 212 | 133 | 204 | 152 | 149 | 172 | 124 | 230 | 151 |
| 7 | 151 | 99 | 152 | 37 | 88 | 199 | 43 | 132 | 74 | 105 | 134 | 110 | 155 | 146 | 107 |
| 8 | 184 | 111 | 232 | 51 | 77 | 66 | 48 | 127 | 192 | 72 | 89 | 113 | 145 | 138 | 152 |

TABLE 3

| | $\delta_1$ | $\phi_{12}$ | $\phi_{13}$ | $\sigma_{12}$ | $\sigma_{13}$ |
|---|---|---|---|---|---|
| 1 | 85 | 162 | 217 | 127 | 174 |
| 2 | 241 | 72 | 187 | 117 | 26 |
| 3 | 1 | 169 | 232 | 211 | 199 |
| 4 | 196 | 151 | 108 | 157 | 183 |
| 5 | 215 | 85 | 59 | 129 | 65 |
| 6 | 168 | 109 | 81 | 166 | 171 |
| 7 | 230 | 113 | 199 | 69 | 157 |
| 8 | 117 | 120 | 35 | 88 | 138 |
| 9 | 186 | 116 | 161 | 145 | 108 |
| 10 | 86 | 178 | 46 | 188 | 105 |
| 11 | 138 | 159 | 193 | 78 | 93 |
| 12 | 6 | 150 | 86 | 208 | 128 |
| 13 | 207 | 82 | 234 | 158 | 56 |
| 14 | 201 | 84 | 118 | 139 | 118 |
| 15 | 246 | 177 | 231 | 184 | 125 |
| 16 | 246 | 201 | 206 | 60 | 165 |
| 17 | 110 | 210 | 46 | 143 | 141 |
| 18 | 133 | 111 | 154 | 82 | 181 |
| 19 | 189 | 198 | 204 | 79 | 122 |
| 20 | 90 | 187 | 184 | 180 | 76 |
| 21 | 156 | 179 | 93 | 93 | 184 |
| 22 | 4 | 51 | 226 | 148 | 234 |
| 23 | 176 | 105 | 204 | 115 | 68 |
| 24 | 218 | 120 | 58 | 77 | 85 |
| 25 | 59 | 101 | 202 | 92 | 112 |
| 26 | 168 | 164 | 93 | 142 | 89 |
| 27 | 41 | 68 | 182 | 149 | 91 |
| 28 | 113 | 221 | 184 | 181 | 130 |
| 29 | 3 | 60 | 171 | 175 | 219 |
| 30 | 44 | 182 | 185 | 167 | 173 |
| 31 | 229 | 166 | 41 | 66 | 111 |
| 32 | 52 | 98 | 201 | 183 | 133 |
| 33 | 160 | 175 | 57 | 187 | 155 |
| 34 | 216 | 203 | 64 | 132 | 69 |
| 35 | 118 | 38 | 37 | 89 | 161 |
| 36 | 197 | 197 | 142 | 137 | 76 |
| 37 | 70 | 89 | 62 | 144 | 122 |
| 38 | 118 | 54 | 232 | 132 | 163 |
| 39 | 182 | 78 | 147 | 189 | 130 |
| 40 | 74 | 98 | 227 | 165 | 172 |
| 41 | 195 | 198 | 47 | 113 | 167 |
| 42 | 18 | 168 | 166 | 113 | 144 |
| 43 | 142 | 82 | 157 | 95 | 69 |
| 44 | 160 | 42 | 21 | 82 | 94 |
| 45 | 127 | 38 | 139 | 125 | 167 |
| 46 | 194 | 165 | 177 | 162 | 119 |
| 47 | 12 | 151 | 159 | 67 | 240 |
| 48 | 145 | 136 | 237 | 116 | 110 |
| 49 | 30 | 168 | 43 | 122 | 99 |
| 50 | 131 | 63 | 211 | 107 | 96 |
| 51 | 215 | 194 | 108 | 184 | 120 |
| 52 | 31 | 234 | 114 | 85 | 183 |
| 53 | 172 | 70 | 81 | 94 | 86 |
| 54 | 27 | 155 | 196 | 137 | 70 |
| 55 | 102 | 155 | 180 | 73 | 183 |
| 56 | 247 | 166 | 234 | 162 | 49 |
| 57 | 71 | 190 | 91 | 97 | 98 |
| 58 | 211 | 81 | 250 | 139 | 90 |
| 59 | 46 | 193 | 209 | 122 | 107 |
| 60 | 143 | 59 | 75 | 172 | 173 |
| 61 | 213 | 72 | 173 | 89 | 143 |
| 62 | 100 | 168 | 36 | 72 | 168 |
| 63 | 186 | 80 | 177 | 142 | 149 |
| 64 | 67 | 161 | 70 | 126 | 146 |

TABLE 4

| | $\delta_1$ | $\phi_{12}$ | $\phi_{13}$ | $\phi_{14}$ | $\sigma_{12}$ | $\sigma_{13}$ | $\sigma_{14}$ |
|---|---|---|---|---|---|---|---|
| 1 | 102 | 94 | 179 | 162 | 75 | 145 | 185 |
| 2 | 232 | 84 | 49 | 194 | 71 | 97 | 28 |
| 3 | 155 | 42 | 116 | 62 | 67 | 89 | 78 |
| 4 | 212 | 103 | 172 | 157 | 115 | 72 | 181 |
| 5 | 238 | 74 | 190 | 176 | 85 | 45 | 38 |
| 6 | 246 | 205 | 197 | 195 | 151 | 138 | 17 |

TABLE 4-continued

| | $\delta_1$ | $\phi_{12}$ | $\phi_{13}$ | $\phi_{14}$ | $\sigma_{12}$ | $\sigma_{13}$ | $\sigma_{14}$ |
|---|---|---|---|---|---|---|---|
| 7 | 92 | 143 | 184 | 68 | 177 | 154 | 148 |
| 8 | 215 | 67 | 108 | 200 | 119 | 88 | 67 |
| 9 | 65 | 182 | 53 | 197 | 137 | 136 | 178 |
| 10 | 239 | 156 | 164 | 214 | 152 | 74 | 148 |
| 11 | 242 | 131 | 169 | 182 | 55 | 66 | 17 |
| 12 | 207 | 77 | 112 | 157 | 81 | 105 | 110 |
| 13 | 180 | 101 | 150 | 200 | 131 | 135 | 146 |
| 14 | 195 | 92 | 232 | 28 | 122 | 70 | 64 |
| 15 | 26 | 177 | 177 | 53 | 98 | 124 | 169 |
| 16 | 203 | 150 | 97 | 208 | 174 | 73 | 190 |
| 17 | 211 | 156 | 201 | 191 | 96 | 103 | 184 |
| 18 | 45 | 172 | 118 | 41 | 154 | 132 | 134 |
| 19 | 15 | 172 | 92 | 219 | 190 | 123 | 148 |
| 20 | 230 | 179 | 196 | 214 | 77 | 155 | 176 |
| 21 | 31 | 138 | 189 | 13 | 185 | 71 | 190 |
| 22 | 223 | 81 | 132 | 51 | 146 | 54 | 107 |
| 23 | 236 | 184 | 140 | 219 | 102 | 70 | 168 |
| 24 | 22 | 91 | 169 | 192 | 181 | 181 | 111 |
| 25 | 9 | 193 | 193 | 211 | 221 | 97 | 160 |
| 26 | 53 | 162 | 83 | 207 | 70 | 119 | 192 |
| 27 | 77 | 92 | 72 | 78 | 164 | 122 | 167 |
| 28 | 37 | 65 | 186 | 207 | 114 | 203 | 169 |
| 29 | 1 | 115 | 195 | 155 | 166 | 122 | 86 |
| 30 | 71 | 150 | 48 | 161 | 141 | 172 | 89 |
| 31 | 83 | 149 | 59 | 167 | 175 | 67 | 124 |
| 32 | 52 | 149 | 142 | 81 | 89 | 137 | 87 |
| 33 | 31 | 179 | 206 | 235 | 115 | 105 | 115 |
| 34 | 125 | 201 | 77 | 170 | 147 | 98 | 65 |
| 35 | 30 | 160 | 144 | 81 | 216 | 215 | 126 |
| 36 | 73 | 99 | 162 | 184 | 178 | 69 | 100 |
| 37 | 251 | 223 | 74 | 189 | 55 | 74 | 169 |
| 38 | 69 | 138 | 172 | 37 | 170 | 72 | 87 |
| 39 | 97 | 182 | 81 | 117 | 85 | 178 | 86 |
| 40 | 126 | 102 | 161 | 228 | 78 | 178 | 89 |
| 41 | 62 | 75 | 180 | 65 | 126 | 125 | 145 |
| 42 | 82 | 188 | 216 | 12 | 181 | 116 | 89 |
| 43 | 117 | 101 | 89 | 213 | 65 | 150 | 83 |
| 44 | 87 | 84 | 110 | 137 | 148 | 71 | 173 |
| 45 | 129 | 152 | 224 | 32 | 110 | 78 | 131 |
| 46 | 227 | 177 | 182 | 91 | 69 | 171 | 141 |
| 47 | 112 | 100 | 65 | 85 | 110 | 137 | 84 |
| 48 | 105 | 178 | 167 | 155 | 119 | 151 | 145 |
| 49 | 1 | 119 | 182 | 222 | 163 | 181 | 236 |
| 50 | 48 | 82 | 193 | 246 | 192 | 127 | 79 |
| 51 | 146 | 142 | 103 | 166 | 122 | 127 | 148 |
| 52 | 245 | 151 | 132 | 233 | 24 | 19 | 44 |
| 53 | 115 | 53 | 60 | 120 | 156 | 190 | 146 |
| 54 | 161 | 177 | 157 | 109 | 157 | 73 | 97 |
| 55 | 184 | 198 | 114 | 201 | 89 | 119 | 84 |
| 56 | 140 | 91 | 69 | 194 | 150 | 143 | 137 |
| 57 | 162 | 74 | 190 | 189 | 76 | 114 | 64 |
| 58 | 220 | 182 | 91 | 48 | 100 | 138 | 151 |
| 59 | 198 | 146 | 67 | 209 | 86 | 98 | 84 |
| 60 | 154 | 140 | 117 | 89 | 115 | 76 | 187 |
| 61 | 85 | 93 | 222 | 165 | 159 | 187 | 185 |
| 62 | 141 | 73 | 162 | 26 | 179 | 102 | 76 |
| 63 | 209 | 152 | 72 | 94 | 125 | 103 | 113 |
| 64 | 194 | 169 | 159 | 191 | 157 | 109 | 100 |

TABLE 5

| | $\delta_1$ | $\delta_2$ | $\phi_{12}$ | $\phi_{13}$ | $\phi_{23}$ | $\sigma_{12}$ | $\sigma_{13}$ | $\sigma_{23}$ |
|---|---|---|---|---|---|---|---|---|
| 1 | 99 | 158 | 143 | 158 | 106 | 156 | 160 | 70 |
| 2 | 196 | 120 | 155 | 197 | 98 | 63 | 61 | 123 |
| 3 | 147 | 123 | 138 | 82 | 67 | 79 | 98 | 154 |
| 4 | 129 | 118 | 129 | 178 | 185 | 100 | 131 | 182 |
| 5 | 111 | 136 | 154 | 141 | 68 | 144 | 119 | 134 |
| 6 | 130 | 147 | 150 | 94 | 35 | 138 | 128 | 135 |
| 7 | 132 | 168 | 135 | 118 | 228 | 127 | 177 | 170 |
| 8 | 161 | 125 | 156 | 147 | 204 | 98 | 78 | 125 |
| 9 | 28 | 101 | 38 | 243 | 195 | 106 | 69 | 88 |
| 10 | 126 | 221 | 180 | 179 | 215 | 114 | 161 | 62 |
| 11 | 98 | 114 | 209 | 14 | 6 | 175 | 147 | 148 |
| 12 | 236 | 64 | 175 | 237 | 83 | 28 | 152 | 72 |
| 13 | 5 | 165 | 71 | 236 | 15 | 150 | 154 | 185 |
| 14 | 131 | 219 | 144 | 96 | 60 | 111 | 88 | 85 |
| 15 | 110 | 170 | 50 | 206 | 186 | 64 | 148 | 146 |
| 16 | 138 | 51 | 191 | 77 | 66 | 125 | 90 | 109 |
| 17 | 88 | 185 | 219 | 225 | 149 | 177 | 147 | 123 |
| 18 | 160 | 115 | 147 | 155 | 61 | 71 | 131 | 103 |
| 19 | 119 | 121 | 136 | 224 | 46 | 97 | 161 | 85 |
| 20 | 136 | 127 | 125 | 185 | 146 | 64 | 165 | 96 |
| 21 | 124 | 121 | 139 | 223 | 188 | 80 | 163 | 166 |
| 22 | 126 | 165 | 140 | 199 | 224 | 69 | 146 | 100 |
| 23 | 143 | 94 | 154 | 224 | 181 | 77 | 151 | 106 |
| 24 | 132 | 111 | 149 | 214 | 31 | 124 | 150 | 151 |
| 25 | 148 | 123 | 76 | 63 | 13 | 152 | 79 | 169 |
| 26 | 128 | 219 | 184 | 40 | 209 | 83 | 87 | 169 |
| 27 | 132 | 152 | 84 | 49 | 84 | 158 | 79 | 119 |
| 28 | 109 | 36 | 187 | 102 | 182 | 70 | 106 | 150 |
| 29 | 108 | 114 | 175 | 54 | 80 | 68 | 107 | 180 |
| 30 | 152 | 134 | 205 | 209 | 46 | 95 | 190 | 179 |
| 31 | 98 | 69 | 190 | 72 | 147 | 79 | 139 | 155 |
| 32 | 108 | 248 | 215 | 53 | 180 | 127 | 113 | 133 |
| 33 | 134 | 54 | 73 | 194 | 40 | 152 | 119 | 177 |
| 34 | 148 | 16 | 63 | 179 | 83 | 127 | 80 | 159 |
| 35 | 215 | 213 | 52 | 111 | 108 | 71 | 135 | 169 |
| 36 | 118 | 182 | 60 | 76 | 244 | 154 | 173 | 140 |
| 37 | 122 | 203 | 59 | 168 | 205 | 153 | 107 | 152 |
| 38 | 130 | 209 | 69 | 165 | 165 | 143 | 100 | 191 |
| 39 | 130 | 141 | 46 | 180 | 59 | 139 | 78 | 68 |
| 40 | 110 | 74 | 54 | 175 | 88 | 178 | 117 | 97 |
| 41 | 119 | 179 | 55 | 65 | 251 | 111 | 96 | 65 |
| 42 | 106 | 140 | 98 | 44 | 142 | 158 | 111 | 166 |
| 43 | 143 | 52 | 57 | 72 | 207 | 64 | 72 | 198 |
| 44 | 143 | 159 | 70 | 59 | 189 | 77 | 66 | 80 |
| 45 | 157 | 89 | 85 | 26 | 241 | 96 | 67 | 135 |
| 46 | 121 | 37 | 83 | 73 | 99 | 86 | 92 | 113 |
| 47 | 120 | 227 | 72 | 83 | 179 | 92 | 85 | 34 |
| 48 | 122 | 156 | 82 | 61 | 103 | 105 | 90 | 191 |
| 49 | 112 | 132 | 70 | 36 | 136 | 161 | 175 | 75 |
| 50 | 87 | 139 | 103 | 230 | 54 | 162 | 76 | 144 |
| 51 | 83 | 140 | 110 | 23 | 40 | 89 | 190 | 84 |
| 52 | 146 | 124 | 101 | 61 | 92 | 117 | 150 | 161 |
| 53 | 143 | 139 | 115 | 39 | 177 | 66 | 126 | 120 |
| 54 | 116 | 170 | 109 | 41 | 219 | 107 | 165 | 112 |
| 55 | 112 | 156 | 146 | 59 | 192 | 71 | 182 | 82 |
| 56 | 92 | 115 | 133 | 218 | 79 | 143 | 65 | 175 |
| 57 | 136 | 141 | 178 | 192 | 25 | 164 | 76 | 157 |
| 58 | 116 | 206 | 79 | 176 | 64 | 89 | 75 | 71 |
| 59 | 140 | 140 | 194 | 204 | 62 | 191 | 100 | 147 |
| 60 | 125 | 11 | 190 | 153 | 210 | 191 | 103 | 178 |
| 61 | 112 | 107 | 63 | 186 | 208 | 99 | 137 | 87 |
| 62 | 136 | 124 | 68 | 203 | 109 | 65 | 97 | 168 |
| 63 | 131 | 55 | 188 | 198 | 164 | 190 | 101 | 123 |
| 64 | 96 | 235 | 175 | 158 | 75 | 187 | 119 | 85 |

TABLE 6

| | $\delta_1$ | $\delta_2$ | $\phi_{12}$ | $\phi_{13}$ | $\phi_{14}$ | $\phi_{23}$ | $\phi_{24}$ | $\sigma_{12}$ | $\sigma_{13}$ | $\sigma_{14}$ | $\sigma_{23}$ | $\sigma_{24}$ |
|---|---|---|---|---|---|---|---|---|---|---|---|---|
| 1 | 89 | 189 | 142 | 152 | 208 | 154 | 207 | 110 | 154 | 166 | 122 | 67 |
| 2 | 141 | 242 | 99 | 220 | 175 | 71 | 47 | 175 | 92 | 148 | 120 | 136 |
| 3 | 159 | 169 | 85 | 105 | 188 | 178 | 79 | 150 | 119 | 162 | 107 | 156 |
| 4 | 127 | 98 | 98 | 166 | 200 | 191 | 157 | 157 | 118 | 150 | 72 | 119 |

TABLE 6-continued

| | $\delta_1$ | $\delta_2$ | $\phi_{12}$ | $\phi_{13}$ | $\phi_{14}$ | $\phi_{23}$ | $\phi_{24}$ | $\sigma_{12}$ | $\sigma_{13}$ | $\sigma_{14}$ | $\sigma_{23}$ | $\sigma_{24}$ |
|---|---|---|---|---|---|---|---|---|---|---|---|---|
| 5 | 135 | 87 | 163 | 205 | 43 | 199 | 78 | 94 | 137 | 130 | 92 | 110 |
| 6 | 113 | 83 | 116 | 92 | 84 | 184 | 50 | 108 | 133 | 127 | 69 | 152 |
| 7 | 128 | 57 | 136 | 105 | 247 | 90 | 41 | 188 | 109 | 106 | 149 | 168 |
| 8 | 134 | 158 | 167 | 72 | 194 | 172 | 45 | 129 | 117 | 126 | 143 | 184 |
| 9 | 113 | 53 | 173 | 50 | 88 | 227 | 223 | 105 | 109 | 88 | 109 | 105 |
| 10 | 118 | 7 | 181 | 138 | 118 | 177 | 213 | 153 | 163 | 126 | 181 | 129 |
| 11 | 112 | 160 | 70 | 72 | 221 | 106 | 231 | 162 | 177 | 115 | 151 | 94 |
| 12 | 52 | 99 | 168 | 195 | 48 | 166 | 91 | 97 | 92 | 167 | 137 | 187 |
| 13 | 158 | 115 | 170 | 164 | 57 | 166 | 193 | 69 | 180 | 131 | 87 | 172 |
| 14 | 70 | 52 | 194 | 216 | 199 | 123 | 55 | 181 | 76 | 78 | 109 | 112 |
| 15 | 209 | 74 | 71 | 194 | 51 | 217 | 161 | 131 | 137 | 147 | 72 | 101 |
| 16 | 31 | 160 | 170 | 210 | 152 | 149 | 164 | 149 | 110 | 135 | 88 | 103 |
| 17 | 178 | 88 | 153 | 81 | 68 | 113 | 16 | 93 | 188 | 89 | 190 | 149 |
| 18 | 126 | 40 | 148 | 90 | 60 | 59 | 159 | 146 | 119 | 173 | 94 | 99 |
| 19 | 208 | 155 | 177 | 146 | 132 | 114 | 80 | 68 | 74 | 99 | 166 | 111 |
| 20 | 152 | 39 | 175 | 143 | 217 | 177 | 172 | 94 | 124 | 77 | 123 | 207 |
| 21 | 74 | 62 | 192 | 187 | 236 | 194 | 200 | 158 | 166 | 119 | 93 | 150 |
| 22 | 71 | 48 | 192 | 89 | 198 | 52 | 20 | 177 | 72 | 108 | 181 | 116 |
| 23 | 48 | 156 | 167 | 74 | 205 | 94 | 155 | 175 | 82 | 103 | 123 | 94 |
| 24 | 69 | 76 | 47 | 143 | 223 | 95 | 182 | 89 | 80 | 190 | 80 | 142 |
| 25 | 172 | 100 | 170 | 202 | 150 | 169 | 113 | 151 | 176 | 78 | 67 | 124 |
| 26 | 132 | 161 | 102 | 105 | 115 | 68 | 197 | 181 | 82 | 93 | 144 | 162 |
| 27 | 179 | 91 | 80 | 213 | 191 | 194 | 155 | 118 | 173 | 128 | 104 | 169 |
| 28 | 201 | 134 | 55 | 46 | 55 | 76 | 41 | 158 | 85 | 116 | 98 | 99 |
| 29 | 189 | 125 | 100 | 147 | 160 | 207 | 237 | 79 | 176 | 83 | 115 | 134 |
| 30 | 116 | 64 | 66 | 176 | 135 | 44 | 212 | 92 | 188 | 98 | 67 | 75 |
| 31 | 147 | 142 | 151 | 176 | 200 | 156 | 92 | 130 | 186 | 156 | 185 | 146 |
| 32 | 120 | 119 | 88 | 15 | 138 | 199 | 76 | 175 | 113 | 125 | 92 | 174 |
| 33 | 151 | 187 | 71 | 179 | 194 | 164 | 213 | 185 | 172 | 141 | 67 | 143 |
| 34 | 152 | 8 | 156 | 71 | 195 | 37 | 179 | 75 | 85 | 167 | 133 | 103 |
| 35 | 223 | 158 | 73 | 81 | 238 | 170 | 243 | 146 | 70 | 83 | 172 | 140 |
| 36 | 82 | 139 | 135 | 138 | 251 | 76 | 97 | 115 | 108 | 183 | 175 | 137 |
| 37 | 165 | 170 | 82 | 142 | 189 | 70 | 159 | 145 | 156 | 147 | 127 | 188 |
| 38 | 86 | 107 | 164 | 147 | 61 | 68 | 94 | 120 | 73 | 88 | 114 | 117 |
| 39 | 163 | 161 | 69 | 113 | 187 | 167 | 162 | 169 | 109 | 135 | 157 | 132 |
| 40 | 180 | 213 | 99 | 100 | 199 | 186 | 224 | 160 | 159 | 181 | 95 | 120 |
| 41 | 65 | 112 | 165 | 170 | 209 | 155 | 201 | 66 | 73 | 104 | 143 | 165 |
| 42 | 56 | 80 | 24 | 206 | 203 | 65 | 54 | 176 | 116 | 153 | 68 | 108 |
| 43 | 145 | 136 | 77 | 170 | 91 | 138 | 167 | 141 | 80 | 171 | 89 | 113 |
| 44 | 54 | 103 | 185 | 169 | 213 | 189 | 57 | 65 | 74 | 113 | 106 | 184 |
| 45 | 157 | 243 | 66 | 95 | 187 | 107 | 32 | 123 | 87 | 145 | 98 | 105 |
| 46 | 129 | 206 | 171 | 97 | 40 | 136 | 74 | 187 | 136 | 137 | 85 | 125 |
| 47 | 69 | 22 | 166 | 163 | 220 | 201 | 51 | 76 | 85 | 84 | 233 | 167 |
| 48 | 159 | 116 | 72 | 50 | 67 | 71 | 196 | 93 | 124 | 138 | 77 | 122 |
| 49 | 112 | 148 | 87 | 176 | 79 | 109 | 171 | 129 | 174 | 78 | 98 | 112 |
| 50 | 122 | 150 | 99 | 189 | 30 | 153 | 230 | 119 | 143 | 98 | 181 | 77 |
| 51 | 195 | 155 | 99 | 105 | 233 | 172 | 76 | 76 | 182 | 179 | 131 | 76 |
| 52 | 180 | 141 | 161 | 197 | 147 | 207 | 57 | 68 | 99 | 114 | 107 | 77 |
| 53 | 143 | 92 | 160 | 181 | 48 | 146 | 77 | 182 | 112 | 101 | 103 | 158 |
| 54 | 40 | 125 | 90 | 59 | 53 | 70 | 66 | 160 | 99 | 182 | 165 | 84 |
| 55 | 129 | 83 | 168 | 190 | 56 | 180 | 62 | 184 | 149 | 85 | 122 | 84 |
| 56 | 89 | 68 | 101 | 202 | 101 | 78 | 240 | 144 | 161 | 70 | 106 | 181 |
| 57 | 126 | 115 | 72 | 156 | 198 | 91 | 86 | 72 | 72 | 139 | 127 | 164 |
| 58 | 155 | 168 | 163 | 72 | 223 | 160 | 15 | 119 | 176 | 104 | 109 | 134 |
| 59 | 237 | 37 | 155 | 49 | 96 | 103 | 29 | 59 | 136 | 138 | 114 | 101 |
| 60 | 114 | 156 | 157 | 177 | 185 | 49 | 52 | 183 | 94 | 183 | 167 | 92 |
| 61 | 136 | 113 | 90 | 211 | 220 | 94 | 91 | 70 | 92 | 165 | 82 | 92 |
| 62 | 111 | 105 | 162 | 153 | 218 | 100 | 209 | 184 | 82 | 121 | 141 | 130 |
| 63 | 143 | 148 | 158 | 181 | 234 | 200 | 156 | 185 | 103 | 110 | 182 | 74 |
| 64 | 89 | 164 | 93 | 71 | 226 | 179 | 213 | 140 | 184 | 146 | 160 | 67 |

TABLE 7

| | $\delta_1$ | $\delta_2$ | $\delta_3$ | $\phi_{12}$ | $\phi_{13}$ | $\phi_{14}$ | $\phi_{23}$ | $\phi_{24}$ | $\phi_{34}$ | $\sigma_{12}$ | $\sigma_{13}$ | $\sigma_{14}$ | $\sigma_{23}$ | $\sigma_{24}$ | $\sigma_{34}$ |
|---|---|---|---|---|---|---|---|---|---|---|---|---|---|---|---|
| 1 | 229 | 254 | 213 | 71 | 175 | 233 | 54 | 148 | 88 | 79 | 159 | 66 | 80 | 95 | 92 |
| 2 | 66 | 230 | 175 | 79 | 151 | 16 | 185 | 41 | 73 | 183 | 161 | 69 | 152 | 76 | 173 |
| 3 | 153 | 140 | 145 | 39 | 134 | 86 | 55 | 159 | 84 | 129 | 70 | 126 | 130 | 78 | 99 |
| 4 | 48 | 19 | 174 | 164 | 176 | 32 | 191 | 108 | 105 | 98 | 188 | 149 | 139 | 124 |  |
| 5 | 50 | 248 | 190 | 209 | 190 | 140 | 217 | 106 | 48 | 95 | 80 | 81 | 140 | 133 | 75 |
| 6 | 128 | 242 | 18 | 65 | 118 | 158 | 231 | 183 | 197 | 108 | 179 | 118 | 147 | 135 | 114 |
| 7 | 114 | 168 | 122 | 150 | 146 | 14 | 91 | 93 | 148 | 92 | 65 | 166 | 101 | 118 | 71 |
| 8 | 254 | 235 | 177 | 193 | 174 | 161 | 117 | 146 | 50 | 108 | 90 | 169 | 83 | 127 | 102 |
| 9 | 90 | 0 | 241 | 54 | 86 | 217 | 201 | 207 | 192 | 145 | 162 | 65 | 134 | 109 | 180 |

TABLE 7-continued

| | $\delta_1$ | $\delta_2$ | $\delta_3$ | $\phi_{12}$ | $\phi_{13}$ | $\phi_{14}$ | $\phi_{23}$ | $\phi_{24}$ | $\phi_{34}$ | $\sigma_{12}$ | $\sigma_{13}$ | $\sigma_{14}$ | $\sigma_{23}$ | $\sigma_{24}$ | $\sigma_{34}$ |
|---|---|---|---|---|---|---|---|---|---|---|---|---|---|---|---|
| 10 | 9 | 113 | 155 | 179 | 170 | 219 | 173 | 56 | 63 | 122 | 115 | 209 | 70 | 102 | 107 |
| 11 | 215 | 57 | 125 | 202 | 139 | 206 | 196 | 36 | 57 | 171 | 177 | 129 | 84 | 87 | 89 |
| 12 | 115 | 202 | 168 | 59 | 175 | 146 | 238 | 85 | 50 | 155 | 141 | 139 | 177 | 98 | 103 |
| 13 | 40 | 35 | 26 | 213 | 185 | 153 | 236 | 185 | 170 | 86 | 83 | 162 | 97 | 73 | 75 |
| 14 | 129 | 246 | 7 | 36 | 56 | 28 | 151 | 226 | 166 | 116 | 120 | 122 | 111 | 99 | 206 |
| 15 | 194 | 17 | 134 | 43 | 189 | 35 | 206 | 169 | 78 | 95 | 163 | 164 | 88 | 188 | 125 |
| 16 | 94 | 158 | 53 | 34 | 195 | 140 | 35 | 187 | 76 | 167 | 147 | 171 | 99 | 191 | 174 |
| 17 | 209 | 200 | 234 | 217 | 79 | 161 | 208 | 73 | 186 | 175 | 158 | 98 | 178 | 68 | 176 |
| 18 | 85 | 211 | 130 | 70 | 81 | 162 | 225 | 145 | 20 | 191 | 163 | 67 | 161 | 113 | 120 |
| 19 | 44 | 144 | 191 | 51 | 168 | 78 | 47 | 33 | 5 | 191 | 167 | 145 | 121 | 132 | 89 |
| 20 | 184 | 252 | 226 | 66 | 201 | 212 | 207 | 25 | 147 | 105 | 166 | 168 | 141 | 68 | 158 |
| 21 | 6 | 118 | 202 | 222 | 82 | 221 | 56 | 181 | 73 | 127 | 182 | 82 | 115 | 91 | 71 |
| 22 | 61 | 211 | 136 | 177 | 156 | 154 | 229 | 31 | 75 | 79 | 99 | 160 | 170 | 145 | 117 |
| 23 | 144 | 75 | 122 | 90 | 146 | 113 | 67 | 178 | 105 | 104 | 110 | 92 | 177 | 181 | 153 |
| 24 | 223 | 144 | 53 | 221 | 134 | 116 | 11 | 82 | 50 | 167 | 103 | 98 | 98 | 120 | 163 |
| 25 | 26 | 26 | 64 | 195 | 114 | 168 | 241 | 175 | 18 | 98 | 107 | 218 | 99 | 117 | 192 |
| 26 | 103 | 24 | 150 | 49 | 58 | 158 | 207 | 179 | 81 | 133 | 166 | 157 | 79 | 165 | 95 |
| 27 | 133 | 99 | 174 | 47 | 176 | 177 | 68 | 183 | 69 | 121 | 88 | 87 | 171 | 126 | 82 |
| 28 | 249 | 140 | 237 | 168 | 149 | 131 | 39 | 67 | 151 | 158 | 10 | 91 | 121 | 185 | 87 |
| 29 | 137 | 166 | 149 | 31 | 167 | 60 | 58 | 25 | 55 | 106 | 136 | 112 | 92 | 189 | 152 |
| 30 | 37 | 119 | 255 | 201 | 203 | 186 | 58 | 115 | 171 | 97 | 124 | 128 | 142 | 143 | 157 |
| 31 | 23 | 157 | 147 | 172 | 57 | 168 | 35 | 121 | 34 | 72 | 120 | 163 | 78 | 86 | 122 |
| 32 | 144 | 199 | 136 | 45 | 135 | 43 | 35 | 34 | 72 | 98 | 149 | 98 | 69 | 167 | 101 |
| 33 | 169 | 158 | 89 | 33 | 217 | 145 | 172 | 228 | 194 | 79 | 84 | 183 | 171 | 99 | 105 |
| 34 | 248 | 159 | 241 | 108 | 160 | 160 | 72 | 78 | 209 | 104 | 67 | 134 | 115 | 119 | 150 |
| 35 | 58 | 122 | 108 | 216 | 100 | 53 | 37 | 181 | 239 | 72 | 151 | 173 | 112 | 68 | 67 |
| 36 | 110 | 227 | 10 | 81 | 159 | 194 | 216 | 188 | 144 | 141 | 122 | 161 | 152 | 167 | 162 |
| 37 | 213 | 238 | 163 | 174 | 151 | 91 | 243 | 130 | 32 | 166 | 153 | 73 | 140 | 84 | 97 |
| 38 | 12 | 169 | 59 | 204 | 173 | 86 | 205 | 150 | 201 | 144 | 125 | 160 | 185 | 116 | 66 |
| 39 | 63 | 111 | 222 | 152 | 165 | 163 | 55 | 106 | 251 | 126 | 136 | 181 | 186 | 165 | 179 |
| 40 | 160 | 110 | 65 | 83 | 161 | 70 | 61 | 76 | 161 | 128 | 90 | 84 | 157 | 131 | 72 |
| 41 | 227 | 231 | 7 | 175 | 160 | 120 | 243 | 159 | 198 | 167 | 156 | 132 | 148 | 152 | 126 |
| 42 | 39 | 37 | 71 | 193 | 173 | 153 | 215 | 119 | 3 | 85 | 186 | 133 | 65 | 113 | 173 |
| 43 | 173 | 150 | 250 | 41 | 205 | 72 | 64 | 47 | 30 | 109 | 108 | 187 | 77 | 70 | 82 |
| 44 | 210 | 6 | 2 | 189 | 150 | 170 | 191 | 109 | 213 | 190 | 141 | 190 | 120 | 126 | 131 |
| 45 | 19 | 244 | 188 | 220 | 210 | 92 | 204 | 39 | 74 | 121 | 212 | 125 | 173 | 87 | 103 |
| 46 | 205 | 146 | 138 | 210 | 163 | 88 | 30 | 220 | 88 | 166 | 182 | 157 | 92 | 127 | 94 |
| 47 | 197 | 209 | 45 | 185 | 206 | 51 | 201 | 169 | 190 | 153 | 76 | 157 | 165 | 157 | 78 |
| 48 | 59 | 250 | 79 | 193 | 71 | 105 | 151 | 94 | 27 | 84 | 86 | 105 | 142 | 127 | 160 |
| 49 | 160 | 138 | 241 | 47 | 193 | 56 | 72 | 144 | 208 | 103 | 110 | 103 | 80 | 71 | 139 |
| 50 | 148 | 224 | 53 | 112 | 192 | 172 | 165 | 151 | 28 | 84 | 151 | 104 | 172 | 123 | 191 |
| 51 | 223 | 49 | 136 | 93 | 106 | 155 | 208 | 212 | 118 | 155 | 122 | 101 | 76 | 200 | 133 |
| 52 | 255 | 145 | 118 | 204 | 212 | 181 | 89 | 152 | 160 | 123 | 12 | 25 | 115 | 85 | 78 |
| 53 | 130 | 228 | 139 | 140 | 160 | 119 | 206 | 87 | 39 | 71 | 181 | 173 | 127 | 154 | 156 |
| 54 | 109 | 108 | 134 | 95 | 78 | 38 | 48 | 170 | 203 | 151 | 147 | 74 | 138 | 186 | 76 |
| 55 | 219 | 253 | 7 | 177 | 194 | 77 | 211 | 215 | 106 | 164 | 153 | 140 | 110 | 120 | 125 |
| 56 | 68 | 47 | 245 | 110 | 165 | 65 | 210 | 203 | 243 | 135 | 188 | 183 | 71 | 104 | 159 |
| 57 | 129 | 133 | 109 | 60 | 88 | 214 | 76 | 87 | 24 | 183 | 180 | 162 | 127 | 191 | 128 |
| 58 | 209 | 167 | 56 | 145 | 199 | 91 | 203 | 18 | 157 | 124 | 150 | 84 | 153 | 176 | 124 |
| 59 | 118 | 196 | 161 | 46 | 217 | 103 | 201 | 42 | 148 | 163 | 156 | 160 | 171 | 102 | 148 |
| 60 | 119 | 255 | 126 | 37 | 54 | 98 | 181 | 157 | 29 | 147 | 116 | 118 | 84 | 93 | 128 |
| 61 | 2 | 11 | 253 | 201 | 196 | 160 | 83 | 119 | 197 | 162 | 197 | 242 | 175 | 173 | 109 |
| 62 | 108 | 179 | 138 | 44 | 70 | 153 | 71 | 170 | 18 | 141 | 107 | 87 | 91 | 139 | 113 |
| 63 | 238 | 34 | 14 | 214 | 158 | 143 | 50 | 79 | 188 | 138 | 150 | 150 | 174 | 138 | 113 |
| 64 | 167 | 254 | 25 | 60 | 166 | 179 | 231 | 142 | 197 | 85 | 90 | 64 | 137 | 87 | 102 |

Figure 8:
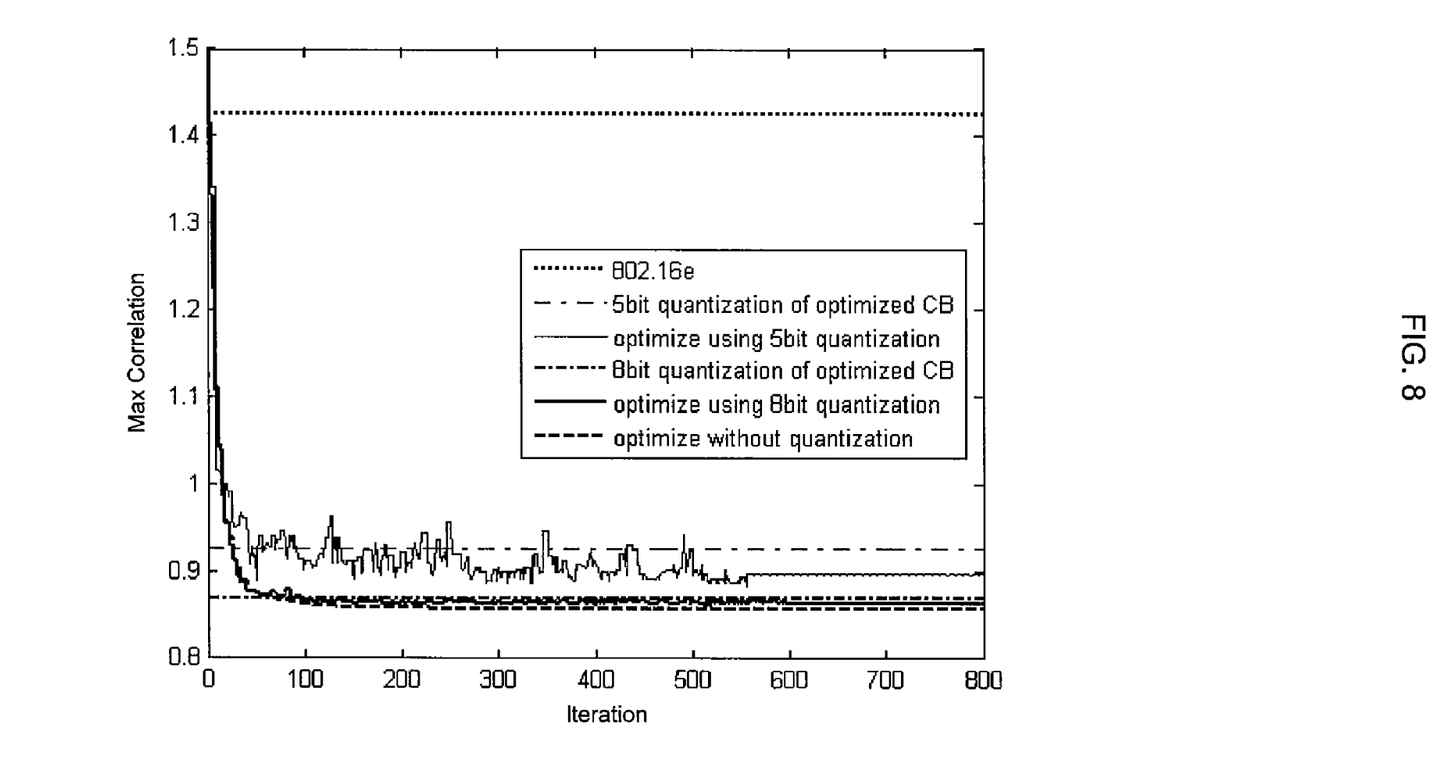
FIG. 8 shows a diagram representing a variation of the maximum correlation according to the codebook parameter quantization.

FIG. 8 shows a graph representing a variation of the maximum correlation according to the quantization of codebook generating parameter.

Referring to FIG. 8, the minimized maximum correlation is increased according to the bit of the quantized parameter. Compared to when the parameter is quantized in 8-bit, an effect caused by an error is reduced further when the parameter is quantized in 5-bit. In addition, compared to when the codebook is optimized and then quantized, a quantization error is reduced further when the quantization is performed from the optimization step.

In the above process, the quantization module 530 quantizes the parameters of codewords.

Subsequently, the optimization determining module 540 determines in step S640 whether the quantized codebook is optimized. There are two methods for determining whether the quantized codebook is optimized.

In a first method, another codebook is generated and optimized, and it is determined whether characteristics thereof are the same as the characteristics of the codebook optimized in the above process. When the characteristics of the codebooks are the same, it is determined that the codebook is optimized. In this case, when the codebook generated in the above process is optimized, as shown in FIG. 7, the codebook generated in the above process and the other optimized codebook have the same maximum correlations.

In a second method, when the number of codewords of the optimized codebook is small, it is determined whether chordal distances between codewords are the same. When the chordal distances are the same as shown in FIG. 9, it is determined that the codebook generated in the above process is optimized.

Figure 9:
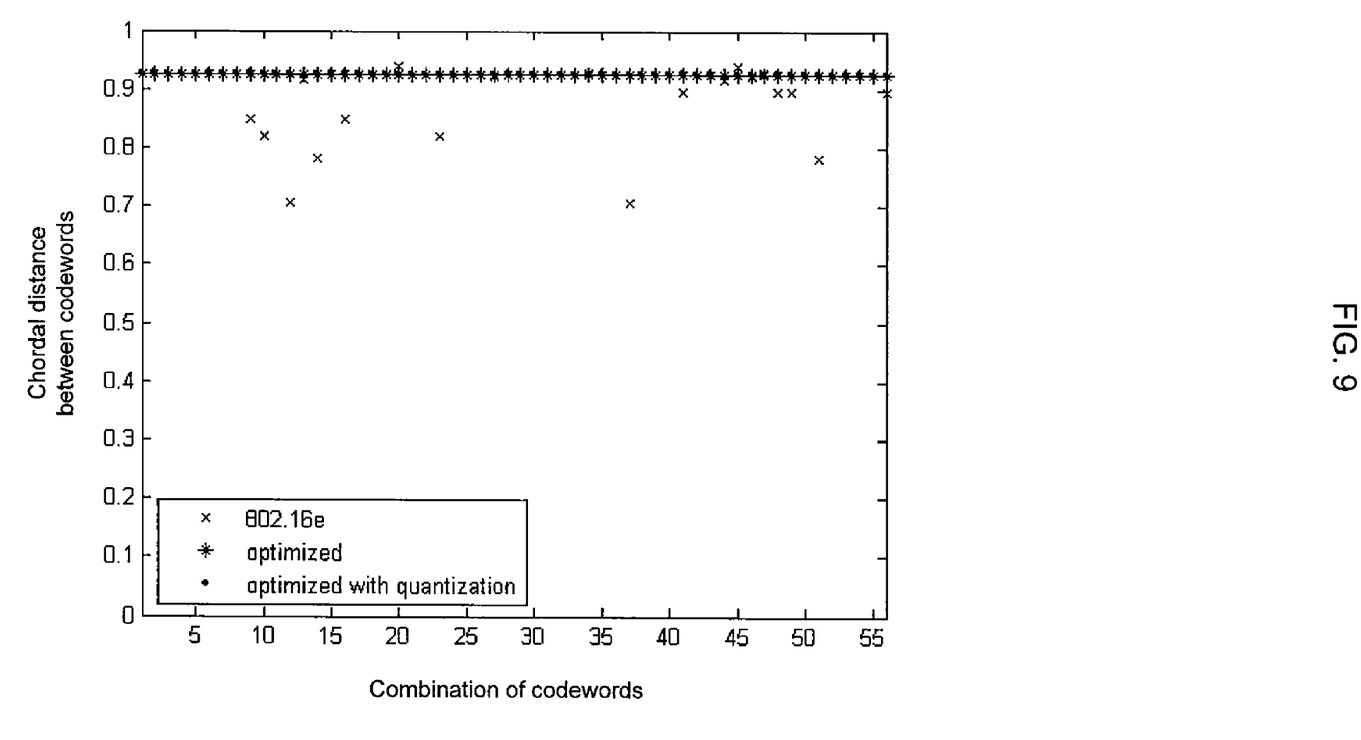
FIG. 9 shows a diagram comparing a distribution of the chordal distances between the codewords of the 3-bit vector optimized codebook to the conventional codebook when the number of transmit antennas is 4 and the number of streams is 1.

FIG. 9 shows a diagram comparing a distribution of the chordal distances between the codewords of the optimized 3-bit vector codebook to the conventional codebook when the number of transmitting antennas is 4 and the number of streams is 1. In FIG. 9, the chordal distances between the codewords are the same when the codebook is optimized.

Subsequently, it is determined whether the quantized codebook is optimized in step S640. When it is determined that the quantized codebook is optimized, the codebook is stored in the optimized codebook storage module 550 in step S650.

The optimized codebook stored in the optimized codebook storage module 550 is stored in the transmitting/receiving terminals of the quantization precoder in the base station and the mobile communication terminal of the mobile communication system, and the mobile communication terminal and the base station use the optimized codebook to perform the wireless communication.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, since the codebook is optimized by the steepest descent algorithm, the maximum correlation of the codebook is minimized, and bit error performance may be improved.

What is claimed is:

1. A method for optimizing a codebook comprising a quantized channel between a base station transmitter and a portable terminal, the method comprising:
   a) selecting the codebook to be optimized;
   b) applying a steepest descent algorithm to respective codewords of the codebook selected in a) and transforming the codewords to minimize correlation between the codewords, where the steepest descent algorithm is an algorithm in which a function indicating the correlation between the codewords is differentiated and is multiplied by a predetermined step size and is used for a parameter for generating a new codeword;
   c) determining whether the codebook including the codewords transformed in b) is optimized; and
   d) storing the codebook when it is determined in c) that the codebook is optimized.

2. The method of claim 1, further comprising, between b) and c), quantizing the codeword transformed in b).

3. The method of claim 2, wherein a parameter for generating the transformed codeword is quantized and a unitary matrix generator is applied to generating transformed codeword and quantizes the transformed codeword.

4. The method of claim 1, wherein, a surrogate function $$f_\alpha(V) = \frac{1}{\alpha} \log\left(\sum_{1 \le i < j \le L} \exp(\alpha \langle \Phi_i^* \Phi_j, \Phi_i^* \Phi_j \rangle)\right)$$

that may be differentiated for all αs that are natural numbers and include a few extremal values for a small α is used as the function indicating the maximum correlation between the codewords in b), and the codebook is given as $\{\Phi_1, \Phi_2, \ldots, \Phi_L\} = V(N_t, N_s, L)$, wherein $\Phi_i$ and $\Phi_j$ respectively denote ith and jth codewords, $V(N_t, N_s, L)$ denotes a codebook having $N_t$ transmitting antennas, $N_s$ streams, and L codeword indexes, and $\Phi_1, \Phi_2, \ldots, \Phi_L$ denotes codewords in the codebook $V(N_t, N_s, L)$.

5. The method of claim 4, wherein b) comprises:
   b-1) detecting the codebook $V_{\alpha_0}$ for minimizing the surrogate function $f_{\alpha_0}$ for an initial value $\alpha_0$;
   b-2) slightly increasing $\alpha_k$ ($>\alpha_{k-1}$) and find a codebook $V_{\alpha_k}$ for that minimizes surrogate function $f_{\alpha_k}$; and
   b-3) increasing α slightly and repeatedly performing the above steps until the surrogate function $f_\alpha$ has the same value as a maximum correlation between the codewords.

6. The method of claim 5, wherein, to detect the codebook $V_{\alpha_k}$ for minimizing the surrogate function $f_{\alpha_k}$ in b-2), a unitary matrix for transforming the existing codeword to a new codeword is parameterized, and the codeword of the codebook $V_{\alpha_{k-1}}$ is parameterized by using the parameterized unitary matrix.

7. The method of claim 6, wherein the parameterized codeword is given as $\tilde{\Phi}_k = U_{N_t \times N_t}(\Theta_k) \Phi_k$, wherein $\tilde{\Phi}_k$ denotes a kth codeword transformed by the unitary matrix $U_{N_t \times N_t}$ and parameterized by $\Theta_k$, $U_{N_t \times N_t}$ denotes a unitary matrix of $N_t$ rows and $N_t$ columns, $\Theta_k$ denotes a parameter for generating a kth new codeword, $\Phi_k$ is a kth codeword to transformed by the unitary matrix, and $U_{N_t \times N_t}(\Theta_k)$ denotes a codeword transformation matrix.

8. The method of claim 7, wherein the unitary matrix is expressed as $N_t^2$ parameters by a unitary parameterization process given as the equation $$U_{N_t \times N_t}(\Theta) = diag(\delta_1, \cdots, \delta_{N_t})$$
$$\times \{U^{N_t-1,N_t}(\phi_{N_t-1,N_t}, \sigma_{N_t-1,N_t})\}$$
$$\times \{U^{N_t-2,N_t-1}(\phi_{N_t-2,N_t-1}, \sigma_{N_t-2,N_t-1}) U^{N_t-1,N_t}(\phi_{N_t-2,N_t}, \sigma_{N_t-2,N_t})\}$$
$$\times \cdots$$
$$\times \{U^{12}(\phi_{12}, \sigma_{12}) \cdots U^{1N_t}(\phi_{1N_t}, \sigma_{1N_t})\},$$

wherein a basic unitary matrix $U^{p,q}(\phi_{p,q}, \sigma_{p,q})$ is expressed as $$\{U^{p,q}(\phi_{p,q}, \sigma_{p,q})\}_{j,k} = \begin{cases} 1 & \text{if } (j,k) = (l,l) \text{ where } l \ne p, l \ne q \\ \cos(\phi_{p,q}) & \text{if } (j,k) = (p,p) \text{ or } (q,q) \\ -\sin(\phi_{p,q})\exp(-i\sigma_{p,q}) & \text{if } (j,k) = (p,q) \\ \sin(\phi_{p,q})\exp(i\sigma_{p,q}) & \text{if } (j,k) = (q,p) \\ 0 & \text{otherwise} \end{cases}$$

and it can be used to change the ith and jth entries of a column vector of a matrix by multiplying the basic unitary matrix.

9. The method of claim 8, wherein the parameter $\Theta_k$ is generated by the equation given as $$\Theta_k = -c\nabla_k f_\alpha(V)$$
$$= -c\frac{\partial}{\partial \Theta_k}\frac{1}{\alpha}\log\left(\begin{array}{c}\sum_{1\leq k<j\leq L}\exp(\alpha\langle\Phi_k^* U_{N_t\times N_t}^*(\Theta_k)\Phi_j,\\ \Phi_k^* U_{N_t\times N_t}^*(\Theta_k)\Phi_j\rangle) +\\ \sum_{1\leq i<j\leq L, i\neq k}\exp(\alpha\langle\Phi_i^*\Phi_j,\Phi_i^*\Phi_j\rangle)\end{array}\right)\Bigg|_{\Theta_k=0}$$

wherein a parameter $-c$ is used to control a convergent speed in a differentiation process.

10. The method of claim 1, wherein a method for generating and optimizing another codebook and determining whether characteristics of the transformed codebook are the same as characteristics of the other codebook or a method determining whether chordal distances between the codewords of the transformed codebook are the same is used to determine in c) whether the transformed codebook is optimized.

11. A device for optimizing a codebook comprising a quantized channel between a base station transmitter and a portable terminal, the device comprising:
an optimized codebook storage module for storing the codebook;
an algorithm module for receiving the codebook and transforming a codeword by using a steepest descent algorithm so that maximum correlation between the codewords of the codebook is minimized, where the steepest descent algorithm is an algorithm in which a function indicating the correlation between the codewords is differentiated and is multiplied by a predetermined step size and is used for a parameter for generating a new codeword;
an optimization determining module connected to the algorithm module to determine whether the codebook which consist of transformed codeword is optimized; and
a control module for controlling the optimized codebook storage module, the algorithm module and the optimization determining module, and storing the codebook including the transformed codeword in the optimized codebook storage module when it is determined by the optimization determining module that the codebook is optimized.

12. The device of claim 11, further comprising a quantization module for quantizing the codeword transformed by the algorithm module to store the codeword in the codebook.

13. The device of claim 11, wherein, to minimize the maximum correlation between the codewords of the codebook, the algorithm module substitutes the correlations between codewords of the codebook by a surrogate function that is transformed to be differentiated, and the surrogate function may be differentiated for all $\alpha$ that are natural numbers and include only a few extremal values for a small $\alpha$.

* * * * *